United States Patent

Watson et al.

(10) Patent No.: US 6,864,096 B2
(45) Date of Patent: Mar. 8, 2005

(54) TEMPERATURE INDICATING PAINT

(75) Inventors: Hugh M L Watson, Derby (GB); Elaine C Hodgkinson, Derby (GB)

(73) Assignee: Rolls-Royce plc, London (GB)

( * ) Notice: Subject to any disclaimer, the term of this patent is extended or adjusted under 35 U.S.C. 154(b) by 337 days.

(21) Appl. No.: 10/226,077

(22) Filed: Aug. 23, 2002

(65) Prior Publication Data

US 2003/0049847 A1 Mar. 13, 2003

(30) Foreign Application Priority Data

Sep. 7, 2001 (GB) .............................................. 0121637
Sep. 7, 2001 (GB) .............................................. 0121638

(51) Int. Cl.$^7$ .......................... G01N 21/78; C09D 5/26
(52) U.S. Cl. .......................... 436/84; 436/73; 436/164; 422/82.12; 106/400; 106/403; 106/404; 106/480
(58) Field of Search .......................... 436/73, 84, 164; 422/82.12; 106/400, 403, 404, 480

(56) References Cited

FOREIGN PATENT DOCUMENTS

| GB | 1103059 P | 2/1968 |
|----|-----------|--------|
| GB | 2204874 A | 11/1998 |

OTHER PUBLICATIONS

Lambourne et al, Paint and Surface Coatings, 1999, William Andrew Publishing, 2nd Edition, pp. 5–6.*

* cited by examiner

*Primary Examiner*—Jill Warden
*Assistant Examiner*—LaToya Cross
(74) *Attorney, Agent, or Firm*—W Warren Taltavull; Manelli Denison & Selter PLLC

(57) ABSTRACT

An irreversible temperature indicating paint comprises 29 wt % to 37 wt % cobalt chromite spinel, alumina, gold purple and frit, 35 wt % to 45 wt % acrylic resin and 20 wt % to 30 wt % silicone resin excluding solvent. The solvent comprises a mixture of 80% 1-methoxy-2-propanol and 20% dipropylene glycol monomethyl ether. A particular irreversible temperature indicating paint comprises 34.9 wt % cobalt chromite spinel, alumina, gold purple and frit, 42.5 wt % acrylic resin and 22.6 wt % silicone resin excluding solvent. The irreversible temperature indicating paint has four or more colour changes in the temperature range 500° C. to 900° C. The irreversible temperature indicating paint is used to determine the temperatures to which various parts of turbine blades, turbine vanes or other component are subjected in operation of a gas turbine engine.

6 Claims, No Drawings

TEMPERATURE INDICATING PAINT

The present invention relates to an irreversible temperature indicating paint.

Irreversible temperature indicating paint changes colour at one or more known temperatures. These colour changes of the temperature indicating paint indicate the temperature to which different parts of a component or components have been subjected. The final colour of the irreversible temperature indicating paint is dependent on both the temperature it is subjected to and the time period over which it is held at a raised temperature. The irreversible temperature indicating paint is applied to a component in a test situation and subsequently analysed to determine the temperatures to which different regions of the component reached during the test. Irreversible temperature indicating paints thus produce a temperature profile over the whole surface of a component rather than discrete points, if for example thermocouples are used.

Irreversible temperature indicating paints are applied to components, for example turbine blades, turbine vanes and combustors, of gas turbine engines and the gas turbine engine is run at the gas turbine engines normal operating conditions.

One known temperature indicating paint described in our UK patent GB1103059 comprises principally lead chromate, magnesium carbonate and silica.

Another known temperature indicating paint described in our UK patent GB2204874 comprises one or more of silver, gold, platinum, palladium, copper, nickel, chromium, titanium and silicon dispersed in 10 to 70 wt % solvent and resin.

Currently used temperature indicating paint used in the temperature range 500° C. to 900° C. does not provide sufficient resolution of the temperature.

Accordingly the present invention seeks to provide a novel irreversible temperature indicating paint which has a plurality of colour changes in the temperature range 500° C. to 900° C. to provide improved temperature resolution.

Accordingly the present invention provides an irreversible temperature indicating paint comprising cobalt chromite spinel, alumina, gold purple, a frit, a binder and a solvent.

Preferably the binder comprises acrylic resin and silicone resin.

The irreversible temperature indicating paint may comprise 29 wt % to 37 wt % cobalt chromite spinel, alumina, gold purple and frit, 35 wt % to 45 wt % acrylic resin and 20 wt % to 30 wt % silicone resin excluding solvent.

The irreversible temperature indicating paint may comprise 33 wt % to 37 wt % cobalt chromite spinel, alumina, gold purple and frit, 37.5 wt % to 45 wt % acrylic resin and 21 wt % to 27.5 wt % silicone resin excluding solvent.

The irreversible temperature indicating paint may comprise 34 wt % to 36 wt % cobalt chromite spinel, alumina, gold purple and frit, 40 wt % to 45 wt % acrylic resin and 22 wt % to 25 wt % silicone resin excluding solvent.

The irreversible temperature indicating paint may comprise 34.9 wt % cobalt chromite spinel, alumina, gold purple and frit, 42.5 wt % acrylic resin and 22.6 wt % silicone resin excluding solvent.

Additionally the present invention provides an irreversible temperature indicating paint comprising cobalt chromite spinel, alumina, gold purple, a frit, sodium alumino sulpho silicate, a binder and a solvent.

The irreversible temperature indicating paint may comprise 29 wt % to 37 wt % cobalt chromite spinel, alumina, gold purple and frit, 14 wt % to 20 wt % sodium alumino sulpho silicate, 30 wt % to 40 wt % acrylic resin and 15 wt % to 25 wt % silicone resin excluding solvent.

The irreversible temperature indicating paint may comprise 30 wt % to 35 wt % cobalt chromite spinel, alumina, gold purple and frit, 14 wt % to 18 wt % sodium alumino sulpho silicate, 32 wt % to 38 wt % acrylic resin and 16 wt % to 22 wt % silicone resin excluding solvent.

The irreversible temperature indicating paint may comprise 31 wt % to 32 wt % cobalt chromite spinel, alumina, gold purple and frit, 15 wt % to 16.5 wt % sodium alumino sulpho silicate, 34 wt % to 36 wt % acrylic resin and 17 wt % to 20 wt % silicone resin excluding solvent.

The irreversible temperature indicating paint may comprise 31.5 wt % cobalt chromite spinel, alumina, gold purple and frit, 15.7 wt % sodium alumino sulpho silicate, 34.6 wt % acrylic resin and 18.1 wt % silicone resin excluding solvent.

The solvent comprises a mixture of propylene glycol ethers. Preferably the solvent comprises a mixture of 80% 1-methoxy-2-propanol and 20% dipropylene glycol monomethyl ether.

The present invention will be more fully described by way of examples.

An irreversible temperature indicating paint according to the present invention has four or more colour changes in the temperature range 500° C. to 900° C. when run at maximum operating conditions of a gas turbine engine, or other engine, for 3 minutes.

A first irreversible temperature indicating paint comprises cobalt chromite spinel, alumina, gold purple, a frit, a binder and a solvent.

This irreversible temperature indicating paint broadly comprises 29 wt % to 37 wt % cobalt chromite spinel, alumina, gold purple and frit, 35 wt % to 45 wt % acrylic resin and 20 wt % to 30 wt % silicone resin excluding solvent. The solvent comprises a mixture of propylene glycol ethers, for example the solvent comprises a mixture of 8% 1-methoxy-2-propanol and 20% dipropylene glycol monomethyl ether. The amount of solvent used is varied depending upon the particular method of applying the irreversible temperature indicating paint.

This irreversible temperature indicating paint more narrowly comprises 33 wt % to 37 wt % cobalt chromite spinel, alumina, gold purple and frit, 37.5 wt % to 45 wt % acrylic resin and 21 wt % to 27.5 wt % silicone resin excluding solvent.

Preferably this irreversible temperature indicating paint comprises 34 wt % to 36 wt % cobalt chromite spinel, alumina, purple gold and frit, 40 wt % to 45 wt % acrylic resin and 22 wt % to 25 wt % silicone resin excluding solvent.

A particular irreversible temperature indicating paint comprises 34.9 wt % cobalt chromite spinel ($CoCr_2O_3$), alumina ($Al_2O_3$), gold purple and frit, 42.5 wt % acrylic resin and 22.6 wt % silicone resin excluding solvent. The cobalt chromite spinel, alumina, gold purple and frit is sold under the trade name CO1E/9831 Decorating Colour Purple by Degussa Metals Catalysts Cerdec AG of Geschaftsbereich Cerdec, P.O. Box 110403, D-60039 Frankfurt, Germany. The cobalt chromite spinel has a green colour.

A second irreversible temperature indicating paint comprises cobalt chromite spinel, alumina, gold purple, a frit, sodium alumino sulpho silicate, a binder and a solvent.

This irreversible temperature indicating paint broadly comprises 29 wt % to 37 wt % cobalt chromite spinel, alumina, gold purple and frit, 14 wt % to 20 wt % sodium alumino sulpho silicate, 30 wt % to 40 wt % acrylic resin and 15 wt % to 25 wt % silicone resin excluding solvent. The solvent comprises a mixture of propylene glycol ethers, for example the solvent comprises a mixture of 80% 1-methoxy-2-propanol and 20% dipropylene glycol monomethyl ether. The amount of solvent used is varied depending upon the particular method of applying the irreversible temperature indicating paint.

This irreversible temperature indicating paint more narrowly comprises 30 wt % to 35 wt % cobalt chromite spinel, alumina, gold purple and frit, 14 wt % to 18 wt % sodium alumino sulpho silicate, 32 wt % to 38 wt % acrylic resin and 16 wt % to 22 wt % silicone resin excluding solvent.

Preferably this irreversible temperature indicating paint comprises 31 wt % to 32 wt % cobalt chromite spinel, alumina, purple gold and frit, 15 wt % to 16.5 wt % sodium alumino sulpho silicate, 34 wt % to 36 wt % acrylic resin and 17 wt % to 20 wt % silicone resin excluding solvent.

A particular irreversible temperature indicating paint comprises 31.5 wt % cobalt chromite spinel ($CoCr_2O_3$), alumina ($Al_2O_3$), gold purple and frit, 15.7 wt % sodium alumino sulpho silicate, 34.6 wt % acrylic resin and 18.1 wt % silicone resin excluding solvent. The cobalt chromite spinel, alumina, gold purple and frit is sold under the trade name CO1E/9831 Decorating Colour Purple by Degussa Metals Catalysts Cerdec AG of Geschaftsbereich Cerdec, P.O. Box 110403, D-60039 Frankfurt, Germany. The cobalt chromite spinel has a green colour.

Decorating Colour Purple CO1E/9831 comprises a frit having a CAS-No 65997-18-4, a cobalt chromite spinel having a CAS-No 68187-49-5, alumina having a CAS-No 1344-28-1 and gold purple having a CAS-No 1345-24-0.

The irreversible temperature indicating paint has four or more colour change points in the temperature range 500° C. to 900° C. The irreversible temperature indicating paint has improved temperature resolution in the temperature range 500° C. to 900° C., particularly in the temperature range 600° C. to 800° C.

The irreversible temperature indicating paint is applied to turbine blades or turbine vanes or other components of gas turbine engines. The irreversible temperature indicating paint is used to determine the temperatures to which various parts of the turbine blade, turbine vane or other component are subjected in operation of the gas turbine engine.

The irreversible temperature indicating paint may be used on components in other engines or other machines or other apparatus to determine the temperature to which various parts of the component are subjected in operation.

We claim:

1. An irreversible temperature indicating paint comprising cobalt chromite spinel, alumina, gold purple, a frit, a binder and a solvent the binder comprising acrylic resin and silicone resin, wherein the irreversible temperature indicating paint comprises 29 wt % to 37 wt % cobalt chromite spinel, alumina, gold purple and frit, 35 wt % to 45 wt % acrylic resin and 20 wt % to 30 wt % silicone resin excluding solvent.

2. An irreversible temperature indicating paint as claimed in claim 1 comprising 33 wt % to 37 wt % cobalt chromite spinel, alumina, gold purple and frit, 37.5 wt % to 45 wt % acrylic resin and 21 wt % to 27.5 wt % silicone resin excluding solvent.

3. An irreversible temperature indicating paint as claimed in claim 2 comprising 34 wt % to 36 wt % cobalt chromite spinel, alumina, gold purple and frit, 40 wt % to 45 wt % acrylic resin and 22 wt % to 25 wt % silicone resin excluding solvent.

4. An irreversible temperature indicating paint as claimed in claim 3 comprising 34.9 wt % cobalt chromite spinel, alumina, gold purple and frit, 42.5 wt % acrylic resin and 22.6 wt % silicone resin excluding solvent.

5. An irreversible temperature indicating paint as claimed in claim 1 additionally comprising sodium alumino sulpho silicate.

6. An irreversible temperature indicating paint as claimed in claim 5 comprising 29 wt % to 37 wt % cobalt chromite spinel, alumina, gold purple and frit, 14 wt % to 20 wt % sodium alumino sulpho silicate, 30 wt % to 40 wt % acrylic resin and 15 wt % to 25 wt % silicone resin excluding solvent.

* * * * *